United States Patent
Markon et al.

(10) Patent No.: US 8,742,702 B2
(45) Date of Patent: Jun. 3, 2014

(54) POSITION DETECTOR FOR MOVING MAGNET TYPE LINEAR MOTOR

(75) Inventors: Sandor Markon, Kyoto (JP); Ahmet Onat, Istanbul (TR)

(73) Assignees: Sabanci University, Istanbul (TR); Fujitec Co., Ltd., Hikone-shi (JP)

(*) Notice: Subject to any disclaimer, the term of this patent is extended or adjusted under 35 U.S.C. 154(b) by 13 days.

(21) Appl. No.: 13/380,253

(22) PCT Filed: Dec. 25, 2009

(86) PCT No.: PCT/JP2009/071543
§ 371 (c)(1),
(2), (4) Date: Dec. 22, 2011

(87) PCT Pub. No.: WO2011/001555
PCT Pub. Date: Jan. 6, 2011

(65) Prior Publication Data
US 2012/0091928 A1    Apr. 19, 2012

(30) Foreign Application Priority Data
Jun. 29, 2009 (JP) ................................. 2009-154275

(51) Int. Cl.
*H02K 41/00* (2006.01)
(52) U.S. Cl.
USPC ........................................................ 318/135
(58) Field of Classification Search
None
See application file for complete search history.

(56) References Cited

U.S. PATENT DOCUMENTS

| 6,731,083 | B2 * | 5/2004 | Marcinkiewicz | 318/254.2 |
| 7,265,460 | B2 * | 9/2007 | Yamazaki et al. | 310/12.19 |
| 2002/0101125 | A1 * | 8/2002 | Ibuki et al. | 310/114 |
| 2004/0061385 | A1 * | 4/2004 | Sato | 310/13 |
| 2006/0001390 | A1 * | 1/2006 | Yamazaki et al. | 318/135 |
| 2008/0218004 | A1 * | 9/2008 | Mukaide | 310/12 |
| 2009/0302693 | A1 * | 12/2009 | Kim | 310/12.31 |
| 2010/0171459 | A1 * | 7/2010 | Aso et al. | 318/647 |
| 2010/0322606 | A1 * | 12/2010 | Kurosawa | 396/55 |
| 2011/0141857 | A1 * | 6/2011 | Manaka et al. | 368/80 |
| 2011/0273789 | A1 * | 11/2011 | Knoedgen | 359/824 |
| 2012/0091928 | A1 * | 4/2012 | Markon et al. | 318/135 |

FOREIGN PATENT DOCUMENTS

| JP | 7-112883 A | 5/1995 |
| JP | 10-104251 A | 4/1998 |
| JP | 2000-341929 A | 12/2000 |
| JP | 2002-186283 A | 6/2002 |
| JP | 2002-223587 A | 8/2002 |

OTHER PUBLICATIONS

Translation of JP-2002-281783.*
International Search Report of PCT/JP2009/071543, mailing date Mar. 23, 2010.

* cited by examiner

*Primary Examiner* — Shawki S Ismail
*Assistant Examiner* — Zoheb Imtiaz
(74) *Attorney, Agent, or Firm* — Westerman, Hattori, Daniels & Adrian, LLP

(57) ABSTRACT

In a moving magnet type linear motor including a stator with a plurality of coils placed in one direction and a mover with a permanent magnet opposed to the stator, a position detector detects the position of the mover. The position detector includes a magnetic body fixed to the mover. One or two or more coils are selected and a voltage is applied to the selected coil while a current or a voltage induced in a coil adjacent to the selected coil is measured, and the position of the magnetic body that changes in response to the position of the mover is determined based on the measured current or the measured voltage.

12 Claims, 13 Drawing Sheets

F I G. 3
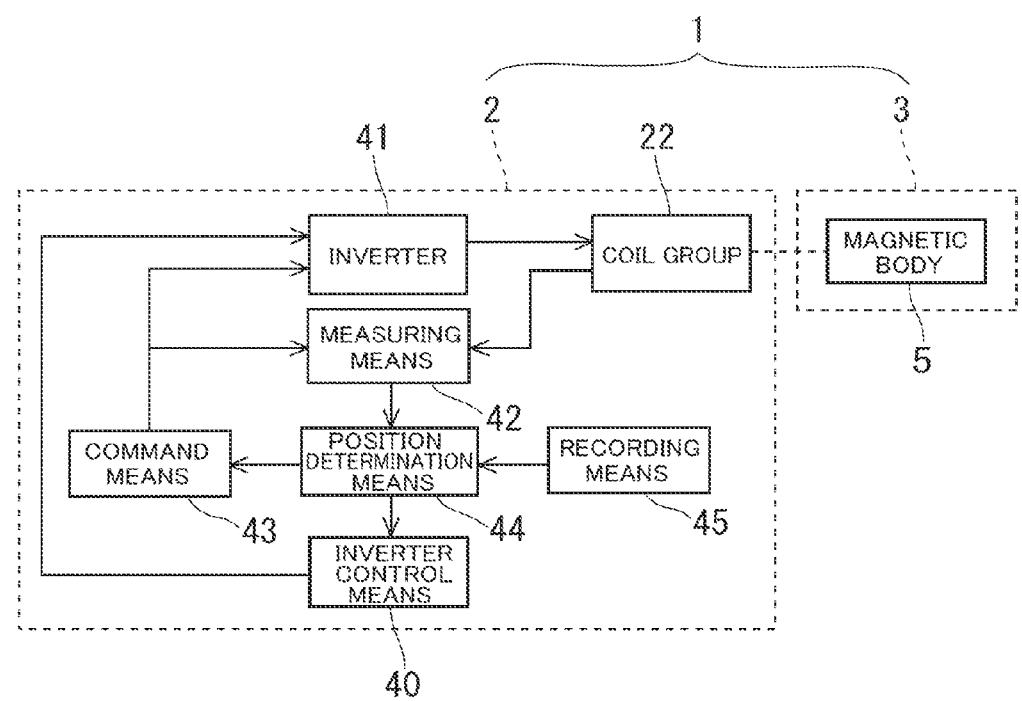

F I G. 1 2
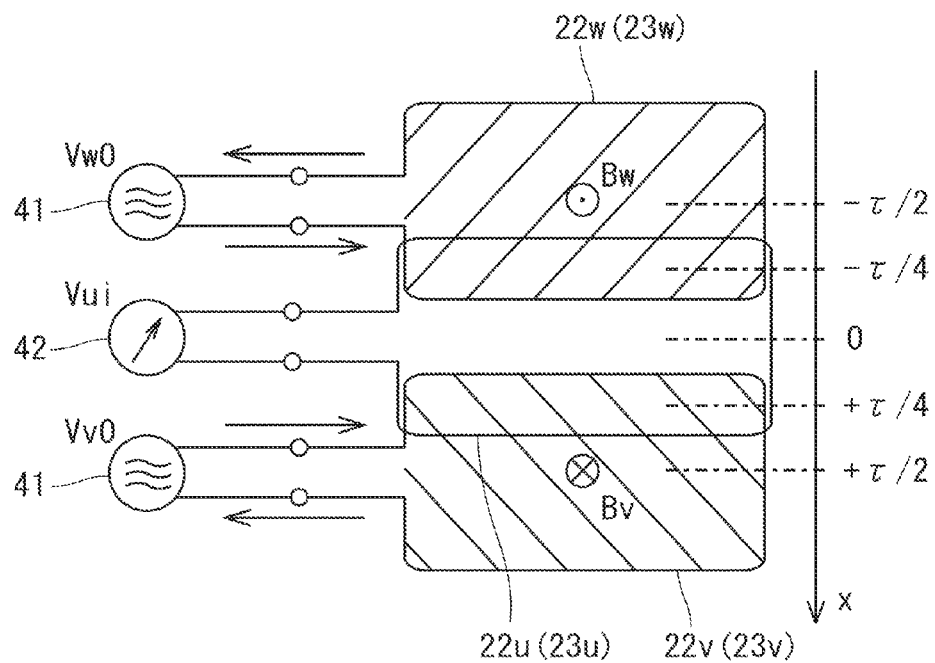
F I G. 1 3
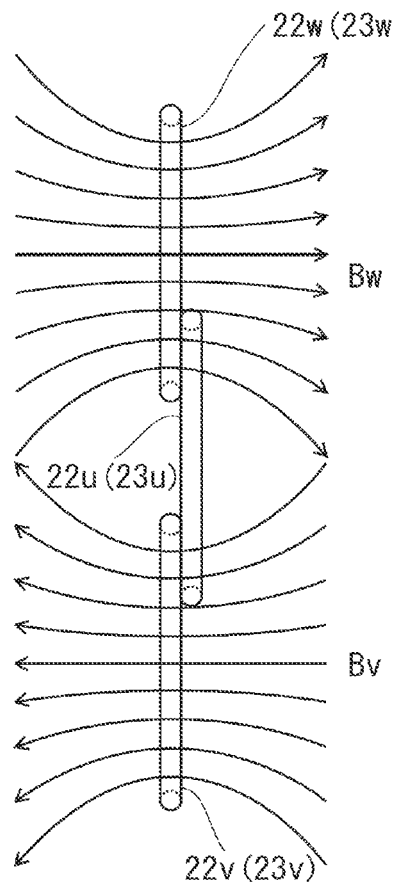

F I G. 2 1
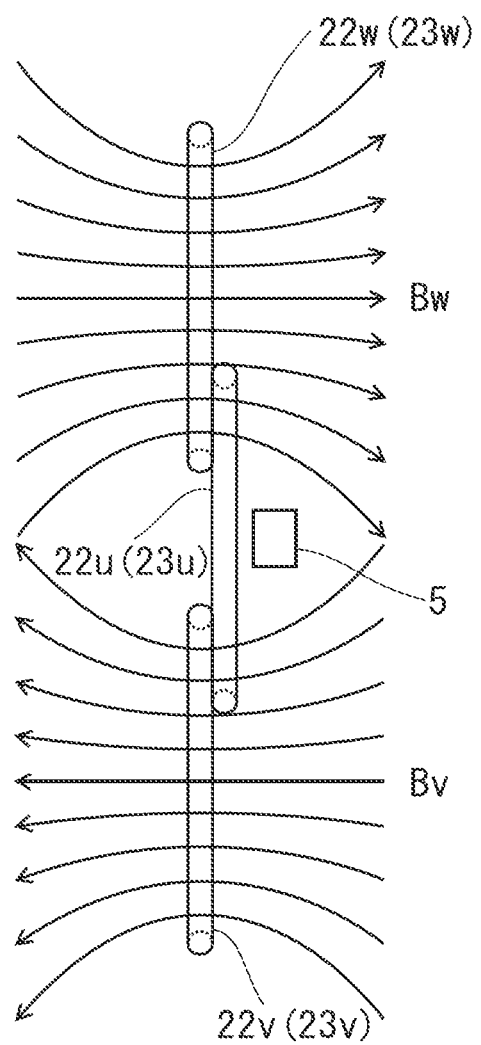

POSITION DETECTOR FOR MOVING MAGNET TYPE LINEAR MOTOR

TECHNICAL FIELD

The present invention relates to a position detector for detecting the position of a mover in a moving magnet type linear motor in which the mover is caused to move in one direction by a magnetic field generated by applying a voltage to a plurality of coils of a stator.

BACKGROUND ART

In a moving magnet type linear motor with coils provided to a stator and a permanent magnet provided to a mover, expensive magnets are not required to be placed along a path. Further, the mover does not generate heat, and does not require power supply. So, the moving magnet type linear motor is widely used as a driving source of a transport mechanism especially with a long path.

In this moving magnet type linear motor, the stator has a plurality of coils placed in one direction, and the permanent magnet of the mover is so placed as to be opposed to the coils of the stator. So, when a polyphase alternating voltage is applied to the coils of the stator to form a shifting magnetic field, thrust to act in the same direction as the shifting magnetic field is generated in the mover, by which the mover is caused to move in the direction.

In recent years, such use of the moving magnet type linear motor as a driving source of an elevator as is described above has been suggested (as introduced for example in patent document 1).

PRIOR ART DOCUMENT

Patent Document

Patent Document 1: Japanese Patent Application Laid-Open No. 7-112883

SUMMARY OF THE INVENTION

Problems to be Solved by the Invention

When the moving magnet type linear motor is used as a driving source especially of a passenger elevator, actions such as those for improving the accuracy in landing, for reducing vibration, for absorbing shock and others should be taken to improve the comfort of ride of the elevator. In order for these actions to be taken in the passenger elevator, the position of the mover to be connected to a car of the passenger elevator should be detected with high accuracy for example in millimeters.

A linear encoder is conventionally provided to the moving magnet type linear motor in order to detect the position of the mover with high accuracy. Servo control is performed using a position detection signal obtained from the linear encoder, so that thrust generated in the mover is controlled.

In the conventional structure using the linear encoder, a controller responsible for the servo control is provided to the stator, and a sensor for position detection is provided to the mover. So, in order for the controller to perform the servo control using a position detection signal obtained from the sensor, the moving magnet type linear motor should be provided with communication means for transmitting a position detection signal from the mover to the stator.

If wireless communication means is employed as this communication means, communication may break down during transmission of a position detection signal. If wired communication means is employed, a communication wire should be placed in a tower in which a car moves. The placement of the communication wire is complicated especially in a multi-car elevator in which a plurality of cars move in a single tower.

It is therefore an object of the present invention to provide a position detector which can detect the position of a mover on the side of a stator, and which realizes detection with high accuracy in a moving magnet type linear motor.

Means for Solving the Problems

In a moving magnet type linear motor including: a stator with a plurality of coils placed in one direction; and a mover with a permanent magnet so placed as to be opposed to the stator, a position detector for a moving magnet type linear motor of the present invention detects the position of the mover in the moving magnet type linear motor. A magnetic field generated by applying a voltage to the plurality of coils of the stator causes the mover to move in the direction. The position detector includes a magnetic body fixed to the mover. One or two or more coils are selected and a voltage is applied to the selected coil while a current or a voltage induced in a coil adjacent to the selected coil is measured, and the position of the magnetic body that changes in response to the position of the mover is determined based on the measured current or the measured voltage.

The change of the position of the magnetic body changes the mutual inductance between adjacent coils. The position detector takes advantage of such change of the mutual inductance responsive to the position of the magnetic body. Here, the mutual inductance is obtained by determining the ratio between a voltage applied to a coil and a voltage induced in a coil adjacent to this coil.

More specifically, the position detector includes: a magnetic body fixed to the mover; power supply control means for generating a magnetic field for position detection by applying a voltage to a coil selected on receipt of a command; measuring means for measuring a current or a voltage induced in a coil selected on receipt of a command; command means; and position determination means. The command means gives a first command to the power supply control means intended to select one or two or more coils as a target of application of a voltage, and a second command to the measuring means intended to select a coil as a target of measurement of a current or a voltage that is adjacent to the coil to be selected by the power supply control means on receipt of the first command. The position determination means determines the position of the magnetic body that changes in response to the position of the mover based on a measured value obtained by the measuring means by controlling the command operation by the command means.

In the position detector, on receipt of the first command from the command means, the power supply control means applies a voltage to one or two or more coils (selected coil) selected based on the first command, thereby generating a magnetic field for position detection. Then, the magnetic field for position detection passes through the inner side of a coil (adjacent coil) adjacent to the selected coil. As a result, a current or a voltage is induced in the adjacent coil.

The magnetic body has low magnetic reluctance. Thus, when the magnetic body exists in a position opposed to the selected coil, the magnetic field for position detection easily passes through the magnetic body. So, magnetic flux density is high in the position in which the magnetic body exists, and is low in other positions. Thus, when the magnetic body exists in a position near the adjacent coil, the amount of magnetic flux passing through the inner side of the adjacent coil increases, by which a current or a voltage induced in the adjacent coil increases. In contrast, when the magnetic body has moved away from the position near the adjacent coil, the amount of magnetic flux passing through the inner side of the adjacent coil decreases, by which a current or a voltage induced in the adjacent coil decreases. That is, a current or a voltage responsive to the position of the magnetic body is induced in the adjacent coil.

In the position detector, the measuring means selects the adjacent coils, and measures a current or a voltage induced in the adjacent coil. The position determination means acquires the measured value obtained by the measuring means, so that the position of the magnetic body corresponding to the measured value can be determined. As a result, the position of the mover corresponding to the position of the magnetic body is detected.

In a first specific structure of the position detector, the second command given from the command means to the measuring means is intended to select coils in a pair placed on opposite sides of a coil to be selected by the power supply control means on receipt of the first command. The measuring means selects coils in a pair on receipt of the second command to measure currents or voltages induced in the coils in a pair. The position determination means acquires two measured values obtained by the measuring means, and determines the position of the magnetic body based on the two measured values.

When a current or a voltage induced in either one of the coils in a pair on opposite sides of the coil to which a voltage is applied is measured, a measured value thereby obtained may have correspondence to a plurality of positions. So, the position of the magnetic body cannot uniquely be defined only by the measurement of a current or a voltage induced in either coil.

In the first specific structure, a current or a voltage induced in the other one of the coils is measured in addition to a current or a voltage induced in the one of the coils, and two measured values thereby obtained are acquired by the position determination means. Then, the position determination means selects a position from one or a plurality of positions corresponding to the one measured value that coincides with or is close to a position of one or a plurality of positions corresponding to the other measured value. So, although the position of the magnetic body cannot uniquely be defined by using only either one of the measured values, it can uniquely be defined by using both of the measured values.

More specifically, the position detector of the first specific structure further includes recording means in which a table indicating the relation between the position of the magnetic body and currents or voltages induced in the coils is stored. Based on the table stored in the recording means, the position determination means determines at least one position corresponding to one of the measured values obtained by the measuring means as first position information, determines at least one position corresponding to the other one of the measured values as second position information, selects a position contained in the first position information that coincides with or is close to a position contained in the second position information, and determines the selected position as the position of the magnetic body.

The table is determined by the size of a coil, the number of turns of wire in the coil, the size of a magnetic body, the magnetic property of the magnetic body, and others, and can be obtained in advance by experiment or by analysis.

In a second specific structure of the position detector, the first command given from the command means to the power supply control means is intended to select coils in a pair targets of application of voltages that are so placed as to hold one coil therebetween, and the second command given from the command means to the measuring means is intended to select the coil as a target of measurement of a current or a voltage that is to be held between the coils in a pair. The position detector further includes voltage adjustment means and judgment means. The voltage adjustment means acquires the measured value obtained by the measuring means, and adjusts voltages to be applied to the coils in a pair in such a way that the measured value obtained by the measuring means becomes a certain value by controlling the power supply control means based on the acquired measured value. The judgment means acquires the measured value obtained by the measuring means, and determines whether or not the acquired measured value coincides with or is close to the certain value. When the judgment means judges that the measured value coincides with or is close to the certain value, the position determination means acquires voltages applied to the coils in a pair from the power supply control means, and determines the position of the magnetic body based on the two acquired voltages.

In the second specific structure, in order to fix a current or a voltage induced in the coil (intermediate coil) held between the coils in a pair at the certain value, voltages applied to the coils in a pair are so adjusted that a current or a voltage induced in the intermediate coil becomes the certain value. The two adjusted voltages are acquired by the position determination means from the power supply control means. The two voltages thereby acquired change in response to the position of the magnetic body, and have one-to-one relation with the position of the magnetic body. Thus, in the position detector, the position of the magnetic body can uniquely be defined by using the two voltages obtained from the power supply control means.

More specifically, the power supply control means applies voltages to the coils in a pair selected on receipt of the first command from the command means in such a way that magnetic fields in opposite directions are generated at the inner side of the coil held between the coils in a pair.

In this specific structure, the voltages applied to the coils in a pair are easily adjusted in such a way that a current or a voltage induced in the coil held between the coils in a pair becomes the certain voltage.

Further specifically, the voltage adjustment means controls the power supply control means to adjust voltages to be applied to the coils in a pair in such a way that the magnetic fields generated by applying the voltages to the coils in a pair offset each other at the inner side of the coil held between the coils in a pair.

The position detector of the second specific structure further includes recording means in which a table indicating the relation between the position of the magnetic body and voltages is stored, the voltages being applied to the coils in a pair when the measured value obtained by the measuring means is the same as the certain value. Based on the table stored in the recording means, the position determination means determines the position of the magnetic body from the two voltages obtained from the power supply control means.

In the position detector, the magnetic body is placed in a position to be opposed to a coil that is different from a coil opposed to the permanent magnet. Further, the magnetic body is made of a paramagnetic material.

In the position detector, the stator is divided into a plurality of segments, in each one of which the plurality of coils are placed in the direction. The power supply control means can control a voltage to be applied to each coil on a segment by segment basis. Thus, the position of the magnetic body can be detected with low power consumption.

Further, each segment includes at least one coil set constituted by three coils.

In the position detector, voltages applied from the power supply control means to the plurality of coils are alternating voltages.

By using an alternating voltage, even when the mover stops and the magnetic body stops accordingly, a current or a voltage is induced in a coil adjacent to a coil to which the voltage is applied, so that the position of the magnetic body can be detected.

Effect of the Invention

The position detector for a moving magnet type linear motor of the present invention can detect the position of a mover on the side of a stator, and realizes detection with high accuracy.

BRIEF DESCRIPTION OF DRAWINGS

FIG. 3 is a block diagram of a moving magnet type linear motor including a position detector according to a first embodiment of the present invention;
FIG. 12 is a plan view explaining a first form of position detection in the second embodiment with attention directed to three coils placed in the direction;
FIG. 13 is a side view of the states of magnetic fields in this first form before voltage adjustment is performed.

FIG. 21 is a side view of the states of magnetic fields in a fourth form of position detection in the second embodiment.

EMBODIMENTS FOR CARRYING OUT THE INVENTION

Embodiments of a position detector for a moving magnet type linear motor according to the present invention are described in detail below with reference to drawings.

1. Moving Magnet Type Linear Motor

Figure 1:
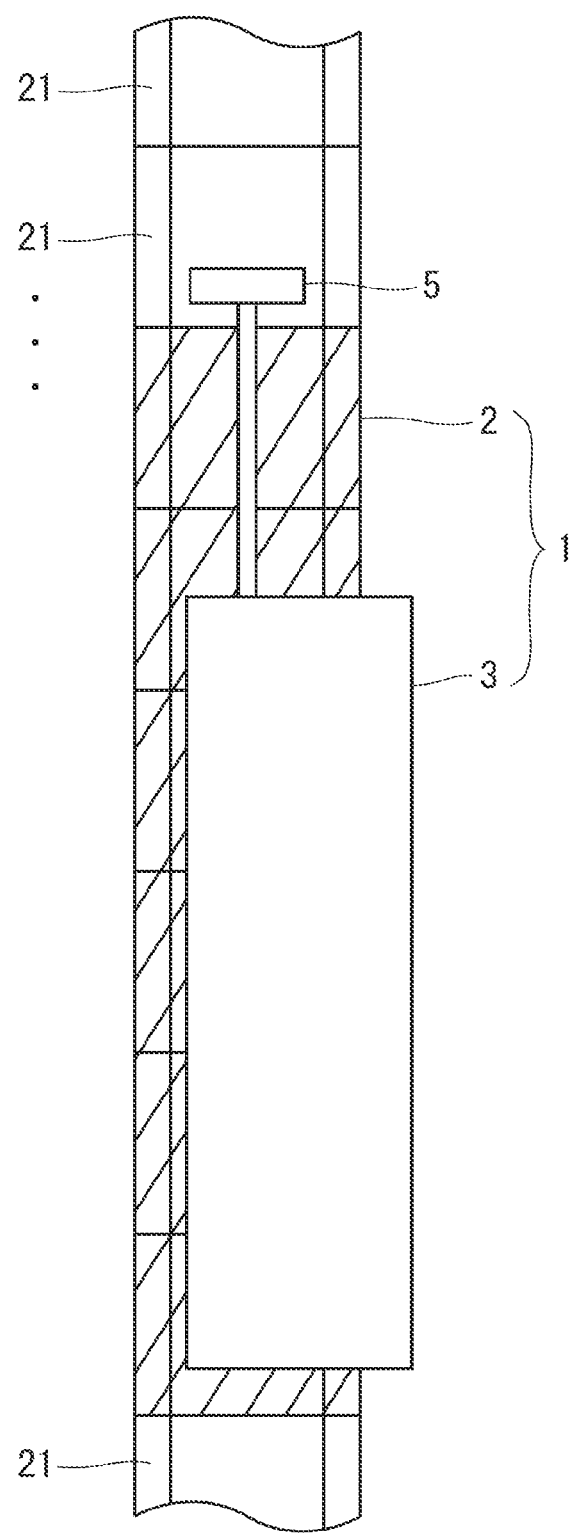
FIG. 1 is a plan view of a moving magnet type linear motor.
Figure 2:
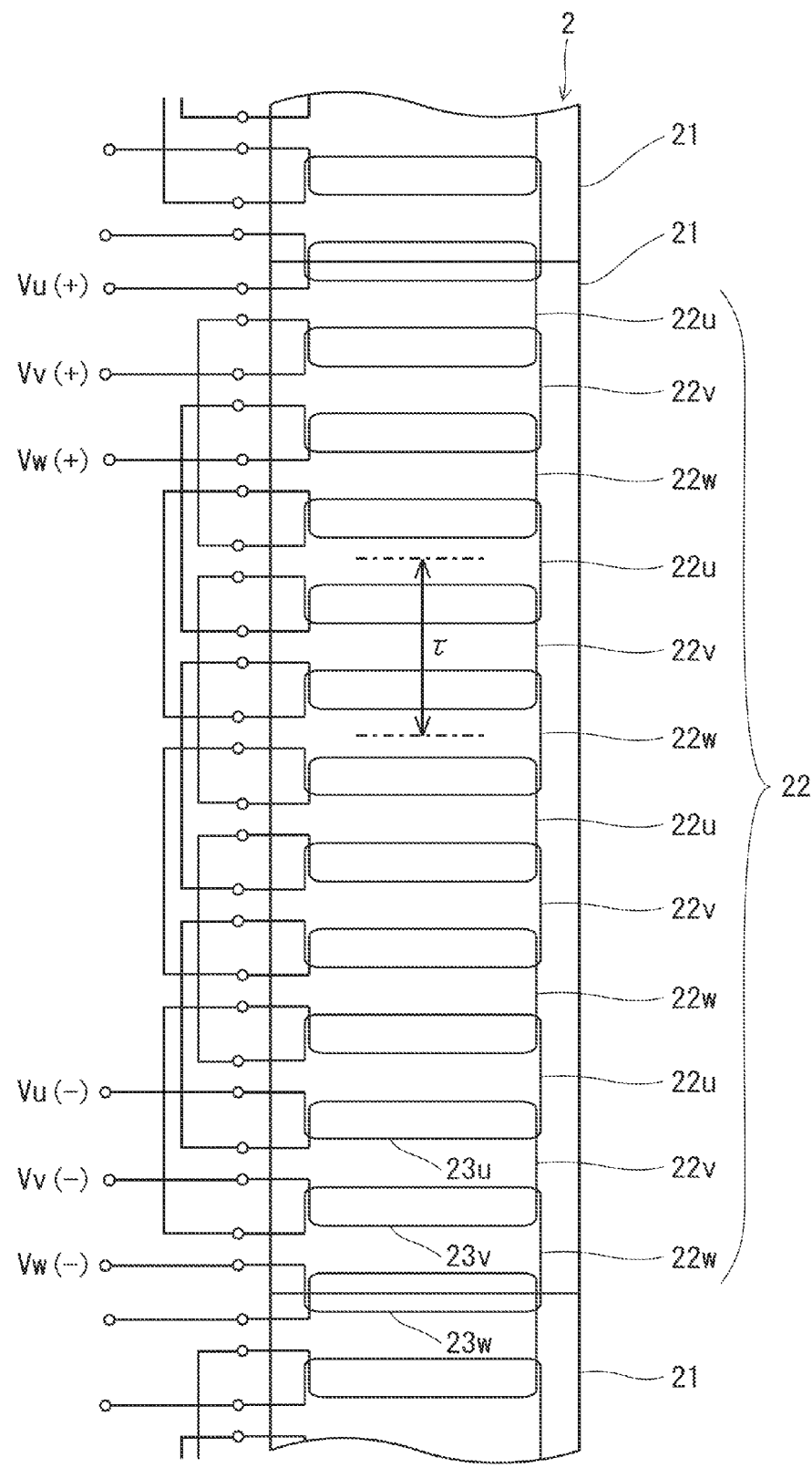
FIG. 2 is a plan view of coil groups provided to a stator.

As shown in FIG. 1, a moving magnet type linear motor 1 includes a stator 2 extending in one direction, and a mover 3 with a plurality of permanent magnets (not shown) so placed as to be opposed to the stator 2. The stator 2 is formed by connecting a plurality of partitioned segments 21, . . . 21 in a row. As shown in FIG. 2, each segment 21 has a coil group 22 placed on a surface to be opposed to the mover 3.

The coil group 22 includes four coil sets each set of which has a U-phase coil 22$u$ to which a U-phase alternating voltage is applied, a V-phase coil 22$v$ to which a V-phase alternating voltage is applied, and a W-phase coil 22$w$ to which a W-phase alternating voltage is applied. The coils 22$u$, 22$v$ and 22$w$ of U to W phases in each coil set are placed in the direction in order of U, V and W. Adjacent ones of the coils overlap in part each other.

In each coil group 22, the four coils of each phase are connected in series. That is, the four U-phase coils 22$u$ form a U-phase series-connected coil 23$u$ in which the four U-phase coils 22$u$ are connected in series, the four V-phase coils 22$v$ form a V-phase series-connected coil 23$v$ in which the four V-phase coils 22$v$ are connected in series, and the four W-phase coils 22$w$ form a W-phase series-connected coil 23$w$ in which the four W-phase coils 22$w$ are connected in series.

The permanent magnets (not shown) provided to the mover 3 each have the north and south poles on opposite sides defined in the direction, and each have a length substantially the same as a center distance τ (see FIG. 2) between the U-phase coil 22$u$ and the W-phase coil 22$w$ belonging to the same coil set.

As shown in FIG. 3, the stator 2 of the moving magnet type linear motor 1 includes an inverter 41 and an inverter control means 40 for controlling the inverter 41. The inverter 41 can control an alternating voltage to be applied to each series-connected coil on a segment 21 by segment 21 basis. When receiving a control command from the inverter control means 40, the inverter 41 applies a three-phase alternating voltage to the coil group 22 based on the received control command, thereby generating a shifting magnetic field at a surface of the stator 2 on which coils are placed.

The inverter 41 can control the magnitude or the propagation velocity of the shifting magnetic field.

When the inverter 41 applies a three-phase alternating voltage to the coil group 14, a U-phase alternating voltage Vu (=Vu(+)−Vu(−)) is applied across the U-phase series-connected coil 23$u$, a V-phase alternating voltage Vv (=Vv(+)−Vv(−)) is applied across the V-phase series-connected coil 23$v$, and phase alternating voltage Vw (=Vw(+)−Vw(−)) is applied across the W-phase series-connected coil 23$w$.

When a shifting magnetic field is generated at the surface of the stator 2 on which coils are placed, thrust to act in the same direction as the shifting magnetic field is generated in the mover 3, thereby causing the mover 3 to move in the direction. By controlling the magnitude or the propagation velocity of the shifting magnetic field, the mover 3 is controlled in speed and others.

The inverter 41 applies three-phase alternating voltages in response to the control command from the inverter control means 40 only to those of the plurality of segments 21, . . . 21 that are to be opposed to the mover 3 in part or in their entirety (diagonally hatched segments shown in FIG. 1). That is, the inverter 41 selects two or more coil groups 22, . . . 22 to which three-phase alternating voltages are applied in response to the command from the inverter control means 40, and applies three-phase alternating voltages to the selected two or more coil groups 22, . . . 22, thereby generating a shifting magnetic field. Thus, the moving magnet type linear motor 1 is driven with low power consumption.

In the moving magnet type linear motor 1, the mover 3 further has a magnetic body 5 fixed thereto as shown in FIG. 1. The magnetic body 5 is made of a paramagnetic material. The magnetic body 5 is placed in a position to be opposed to the segment 21 different from a group of the segments 21 opposed to the mover 3 in part or in their entirety. Here, the magnetic body 5 is placed in a position to be opposed to the segment 21 apart from this group with one different segment 21 held therebetween.

The moving magnet type linear motor 1 is provided with a position detector for detecting the position of the mover 3. The magnetic body 5 and the inverter 41 described above constitute part of the position detector.

2. First Embodiment of Position Detector

As shown in FIG. 3, a position detector of the first embodiment includes measuring means 42, command means 43, position determination means 44, and recording means 45 in addition to the magnetic body 5 and the inverter 41.

The inverter 41 can receive a first command from the command means 43 that is different from the above-described command from the inverter control means 40. When receiving the first command from the command means 43, the inverter 41 selects one series-connected coil from the series-connected coils $23u$, $23v$ and $23w$ of U to W phases placed in the segment 21 opposed to the magnetic body 5, and applies an alternating voltage to the selected series-connected coil. As a result, a magnetic field for position detection different from a shifting magnetic field is generated at a surface of the segment 21 on which coils are placed and which is opposed to the magnetic body 5.

The measuring means 42 can receive a second command from the command means 43 that is different from the first command. When receiving the second command from the command means 43, the measuring means 42 selects two series-connected coils from the series-connected coils $23u$, $23v$ and $23w$ of U to W phases placed in the segment 21 opposed to the magnetic body 5, and measures voltages (induced voltage) induced in the selected two series-connected coils.

In response to a control command from the position determination means 44, the command means 43 gives the first command to the inverter 41 intended to select one series-connected coil as a target of application of a voltage from the series-connected coils $23u$, $23v$ and $23w$ of U to W phases placed in the segment 21 opposed to the magnetic body 5. Further, the command means 43 gives the second command to the measuring means 42 intended to select the other series-connected coils in a pair as targets of measurement of induced voltages that are different from the series-connected coil to be selected by the inverter 41 on receipt of the first command.

The present embodiment is described next with attention directed to the three coils $22u$, $22v$ and $22w$ which are placed in the direction, and which belong to the series-connected coils $23u$, $23v$ and $23w$ of U to W phases (see for example FIG. 4).

Figure 4:
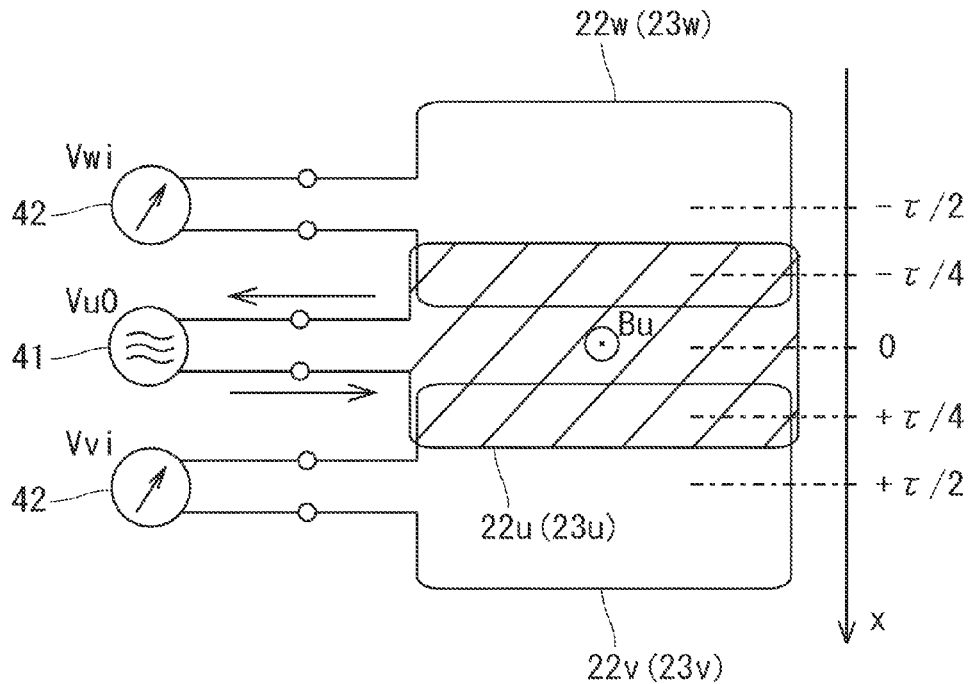
FIG. 4 is a plan view explaining a first form of position detection in the first embodiment with attention directed to three coils placed in one directions.

As shown in FIG. 4, when the inverter 41 selects the U-phase coil $22u$ on receipt of the first command from the command means 43, the measuring means 42 selects the V-phase coil $22v$ and the W-phase coil $22w$ on receipt of the second command from the command means 43 that are placed on opposite sides of the U-phase coil $22u$ selected by the inverter 41 on receipt of the first command.

Figure 5:
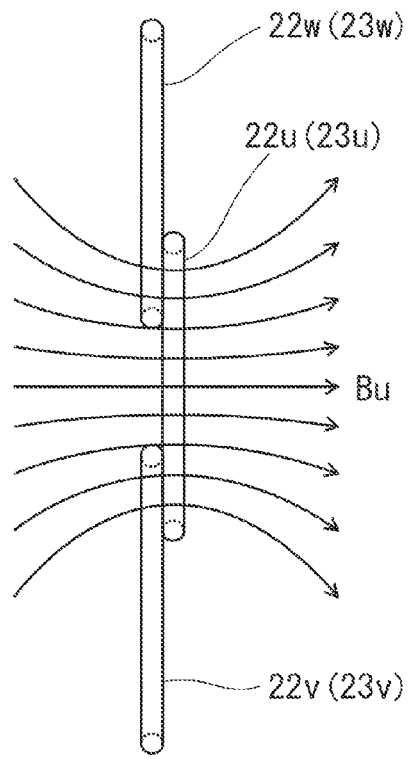
FIG. 5 is a side view of the state of a magnetic field in this first form.

In this case, an alternating voltage VuO is applied to the U-phase coil $22u$ to generate a magnetic field Bu for position detection as shown in FIG. 4. So, as shown in FIG. 5, the magnetic field Bu for position detection passes through regions inside the V-phase coil $22v$ and the W-phase coil $22w$ respectively in which the coils overlap. Then, voltages Vvi and Vwi are induced in the V-phase coil $22v$ and the W-phase coil $22w$, and the induced voltages Vvi and Vwi are measured by the measuring means 42.

Figure 6:
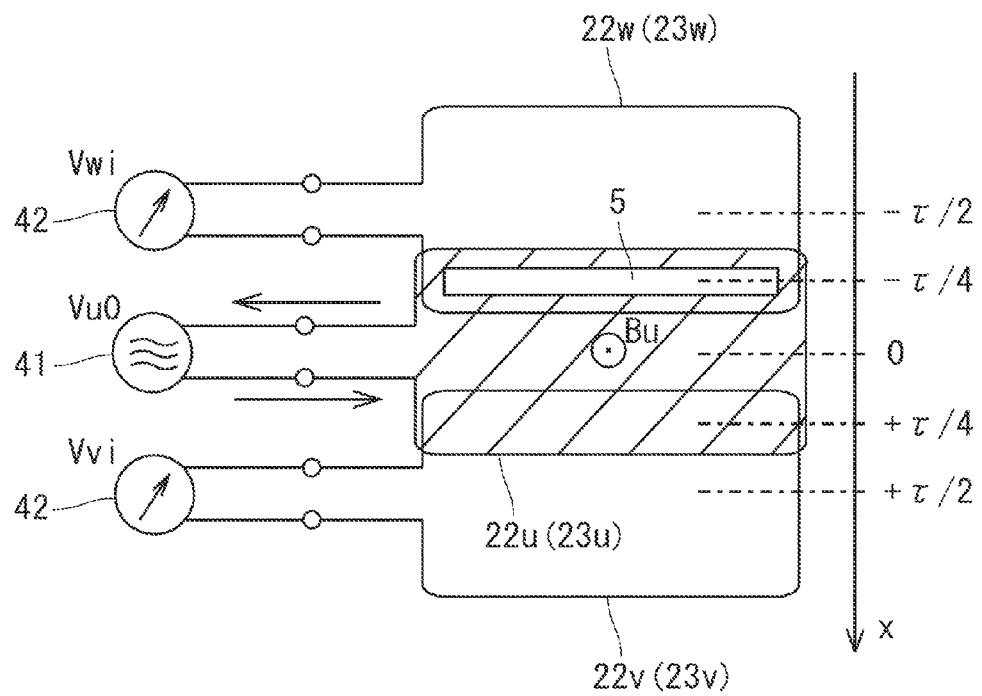
FIG. 6 is a plan view explaining a second form of position detection in the first embodiment with attention directed to three coils placed in the direction.

The magnetic body 5 has low magnetic reluctance. Thus, when the magnetic body 5 exists in a position opposed to the U-phase coil $22u$ to which the alternating voltage is applied as shown in FIG. 6, the magnetic field Bu for position detection easily passes through the magnetic body 5. So, the magnetic flux density of the magnetic field Bu is high in the position in which the magnetic body 5 exists, and is low in other positions as shown in FIG. 7.

Figure 7:
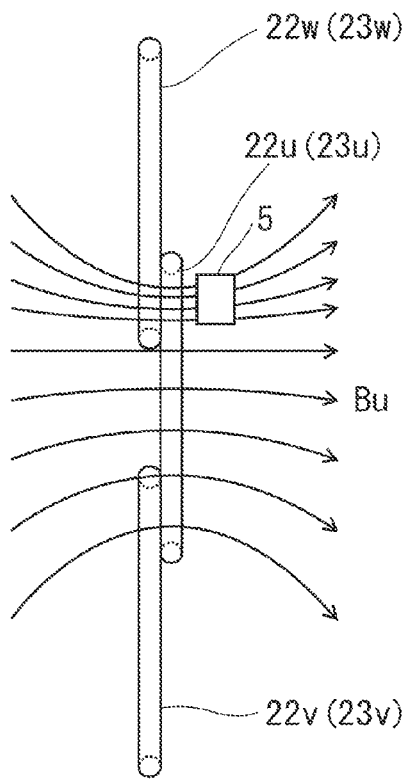
FIG. 7 is a side view of the state of a magnetic field in this second form.

Accordingly, when the magnetic body 5 exists in a position opposed to a region in which the U-phase coil $22u$ and the W-phase coil $22w$ adjacent thereto overlap each other (when the magnetic body 5 exists in a magnetic body's position $x=-\tau/4$ or its neighboring position) as shown in FIGS. 6 and 7, the amount of magnetic flux of the magnetic field Bu passing through the inner side of the W-phase coil $22w$ increases, by which the voltage Vwi induced in the W-phase coil $22w$ increases.

Figure 8:
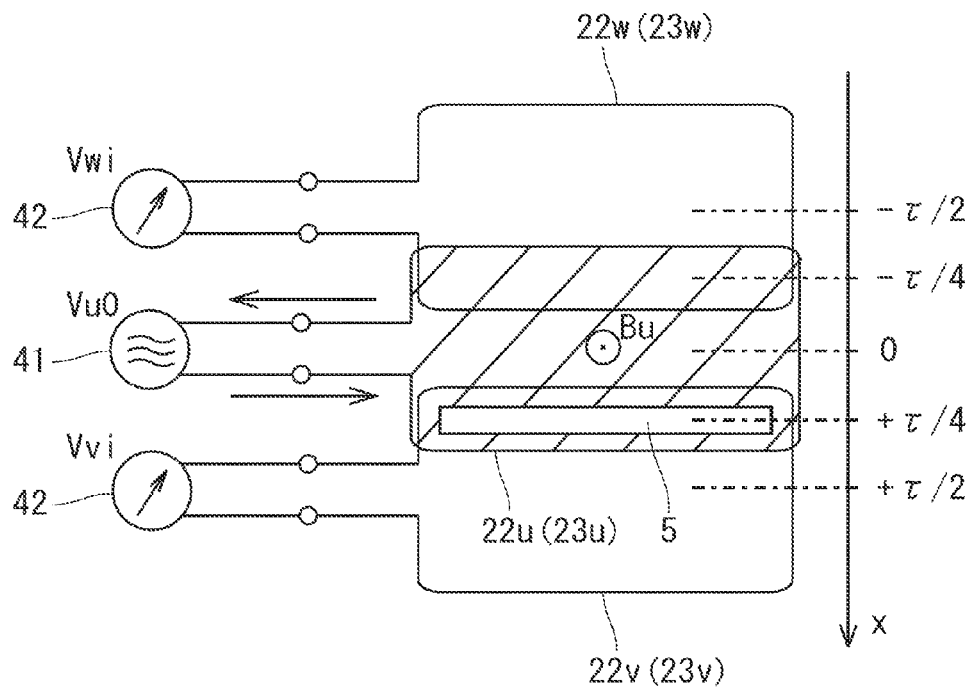
FIG. 8 is a plan view explaining a third form of position detection in the first embodiment with attention directed to three coils placed in the direction.
Figure 9:
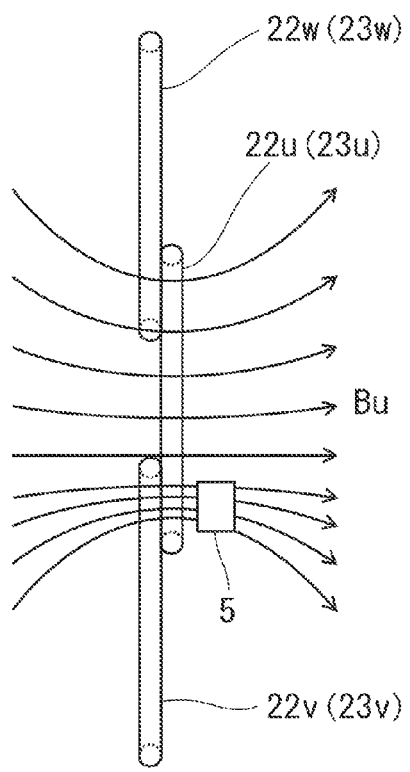
FIG. 9 is a side view of the state of a magnetic field in this third form.

In contrast, when the magnetic body 5 has moved away from the position opposed to the region in which the U-phase coil $22u$ and the W-phase coil $22w$ overlap each other as shown in FIGS. 8 and 9, the amount of magnetic flux of the magnetic field Bu passing through the inner side of the W-phase coil $22w$ decreases, by which the voltage Vwi induced in the W-phase coil $22w$ decreases.

Figure 10:
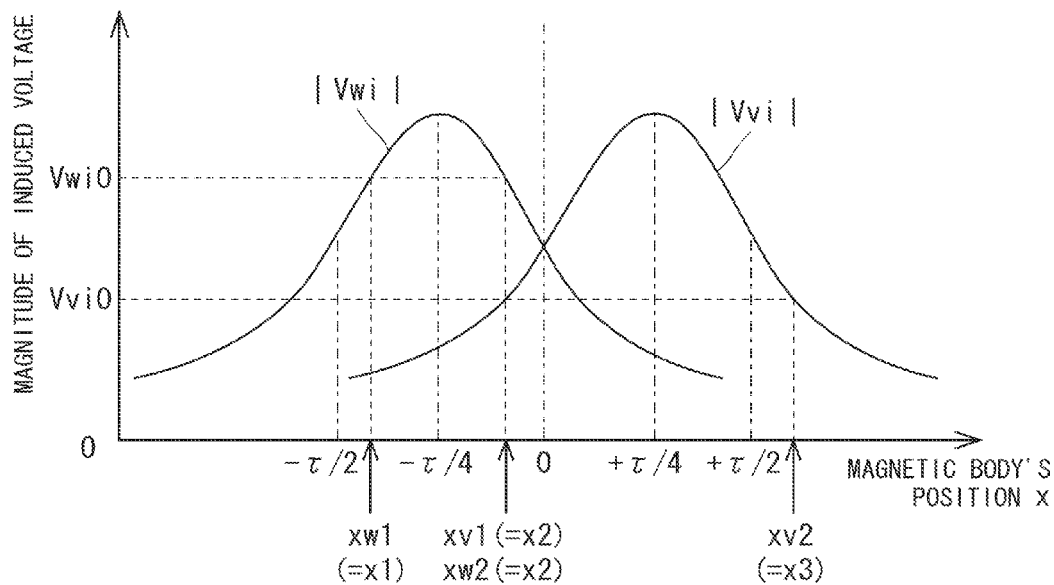
FIG. 10 shows relations between a magnetic body's position and induced voltages.

Thus, the voltage Vwi responsive to the position x of the magnetic body 5 is induced in the W-phase coil $22w$ as shown in FIG. 10. FIG. 10 shows that the magnitude |Vwi| of the induced voltage Vwi changes in response to the magnetic body's position X.

When the magnetic body 5 exists in a position opposed to a region in which the U-phase coil $22u$ and the V-phase coil $22v$ adjacent thereto overlap each other (when the magnetic body 5 exists in the magnetic body's position $x=+\tau/4$ or its neighboring position) as shown in FIGS. 8 and 9, the amount of magnetic flux of the magnetic field Bu passing through the inner side of the V-phase coil $22v$ increases, by which the voltage Vvi induced in the V-phase coil $22v$ increases.

In contrast, when the magnetic body 5 has moved away from the position opposed to the region in which the U-phase coil $22u$ and the V-phase coil $22v$ overlap each other as shown in FIGS. 6 and 7, the amount of magnetic flux of the magnetic field Bu passing through the inner side of the V-phase coil 22v decreases, by which the voltage Vvi induced in the V-phase coil 22v decreases.

Thus, the voltage Vvi responsive to the position x of the magnetic body 5 is induced in the V-phase coil 22v as shown in FIG. 10. FIG. 10 shows that the magnitude Vvi of the induced voltage Vvi changes in response to the magnetic body's position x.

The recording means 45 contains a table showing the relation between the magnetic body's position x and the magnitude |Vvi| of the voltage induced in the V-phase coil 22v shown in FIG. 10, and a table showing the relation between the magnetic body's position x and the magnitude |Vwi| of the voltage induced in the W-phase coil 22w shown in FIG. 10.

These tables are determined by the size of a coil, the number of turns of wire in the coil, the size of a magnetic body, the magnetic property of the magnetic body, and others, and can be obtained in advance by experiment or by analysis. The tables may be obtained by experiment as follows: The voltage Vvi induced in the V-phase coil 22v and the voltage Vwi induced in the W-phase coil 22w are measured while the magnetic body 5 is actually caused to move. The tables may be obtained by analysis as follows: A magnetic field model is formulated about a system including the moving magnet type linear motor 1 and the magnetic body 5, and analysis is conducted on the magnetic field model using the finite element method.

The position determination means 44 acquires the two induced voltages Vvi and Vwi as measured values Vvi0 and Vwi0 that are measured by and received from the measuring means 42. Based on the two acquired measured values Vvi0 and Vwi0, the position determination means 44 determines the position of the magnetic body 5 that changes in response to the position of the mover 3.

More specifically, as shown in FIG. 10, based on the tables stored in the recording means 45, the position determination means 44 determines two positions xv1 (=x2) and xv2 (=x3) as first position information that correspond to the one measured value Vvi0 received from the measuring means 42, and determines two positions xw1 (=x1) and xw2 (=x2) as second position information that correspond to the other measured value Vwi0 received from the measuring means 42. Then, the position determination means 44 compares the first and second position information to select the position xv1 (=x2) from the positions xv1 (=x2) and xv2 (=x3) contained in the first position information that coincides with or is close to the position xw1 (=x1) or xw2 (=x2) contained in the second position information, and determines the selected position xv1 (=x2) as the position of the magnetic body 5.

When positions corresponding to the measured values Vvi0 and Vwi0 are determined by using the tables stored in the recording means 45 as described above, either one of the two measured values Vvi0 and Vwi0 provides a plurality of positions corresponding to this measured value (as an example, the plurality of positions xv1 and xv2 corresponding to the measured value Vvi0). Thus, the position of the magnetic body 5 cannot uniquely be defined.

In contrast, in the position detector of the first embodiment, both of the two measured values Vvi0 and Vwi0 provide the two pieces of corresponding position information. So, although the position of the magnetic body 5 cannot uniquely be defined only by using position information received from one measured value, it can uniquely be defined by using position information received from the other measured value.

An induced voltage, when it is detected by the measuring means 42, is detected with high accuracy as the magnitude thereof is greater. That is, the relations (tables) between the magnetic body's position x and the induced voltages shown in FIG. 10 have high reliability within respective ranges having widths of the order of $\tau$, with positions regarded as the respective centers of the widths at which the induced voltages peak.

Thus, in the above-described determination of the position of the magnetic body 5 from the two measured values Vvi0 and Vwi0 based on the tables, the position of the magnetic body 5 has high accuracy when it is detected in a region in which the relation between the magnetic body's position x and the magnitude |Vvi0| of the induced voltage and the relation between the magnetic body's position x and the magnitude |Vwi0| of the induced voltage overlap each other in their respective ranges of high accuracy, namely when it is detected in a range where x is between $-\tau/4$ and $+\tau/4$ with respect to the center position of the U-phase coil 22u (x=0).

When the inverter 41 selects the V-phase coil 22v on receipt of the first command from the command means 43, and the measuring means 42 selects the W-phase coil 22w and the U-phase coil 22u on receipt of the second command from the command means 43 that are placed on opposite sides of the V-phase coil 22v selected by the inverter 41 on receipt of the first command, the position of the magnetic body 5 with high accuracy is detected in a range where x is between $-\tau/4$ and $+\tau/4$ with respect to the center position of the V-phase coil 22v (x=0) based on the same principle as that described above.

Likewise, when the inverter 41 selects the W-phase coil 22w on receipt of the first command from the command means 43, and the measuring means 42 selects the U-phase coil 22u and the V-phase coil 22v on receipt of the second command from the command means 43 that are placed on opposite sides of the W-phase coil 22w selected by the inverter 41 on receipt of the first command, the position of the magnetic body 5 with high accuracy is detected in a range where x is between $-\tau/4$ and $+\tau/4$ with respect to the center position of the W-phase coil 22w (x=0).

When an alternating voltage is applied to any one of the coils 22u, 22v and 22w of U to W phases to perform the detection, the detected position of the magnetic body 5 may be beyond the range where x is between $-\tau/4$ and $+\tau/4$. In this case, an alternating voltage is applied to a different coil to perform the detection again, so that the position of the magnetic body 5 with high accuracy can be detected in a range where x is between $-\tau/4$ and $+\tau/4$ with respect to the center position of the coil to which the alternating voltage is applied (x=0).

Thus, the position detector of the first embodiment can detect the position of the magnetic body 5 with high accuracy regardless of where the detected position of the magnetic body 5 is.

As described, the position detector of the first embodiment detects the position of the magnetic body 5 based on a voltage induced in a coil. So, in the moving magnet type linear motor 1, the position of the mover 3 is detected on the side of the stator 2. Thus, unlike the conventionally used moving magnet type linear motor, communication means is not required to be provided in the moving magnet type linear motor 1 even when servo control or the like is performed by using the detected position of the mover 3.

Further, an alternating voltage is applied to a coil to generate a magnetic field for position detection in the position detector described above. So, the generated magnetic field is an oscillating magnetic field. Thus, even when the mover 3 stops and the magnetic body 5 stops accordingly, voltages are induced in adjacent coils in a pair placed on opposite sides of the coil to which the alternating voltage is applied, so that the position of the magnetic body 5 can be detected.

In the position detector described above, an alternating voltage is applied only to one series-connected coil of the series-connected coils 23u, 23v and 23w of U to W phases placed in the segment 21 opposed to the magnetic body 5. This reduces power consumption required for detecting the position of the magnetic body 5.

3. Second Embodiment of Position Detector

Figure 11:
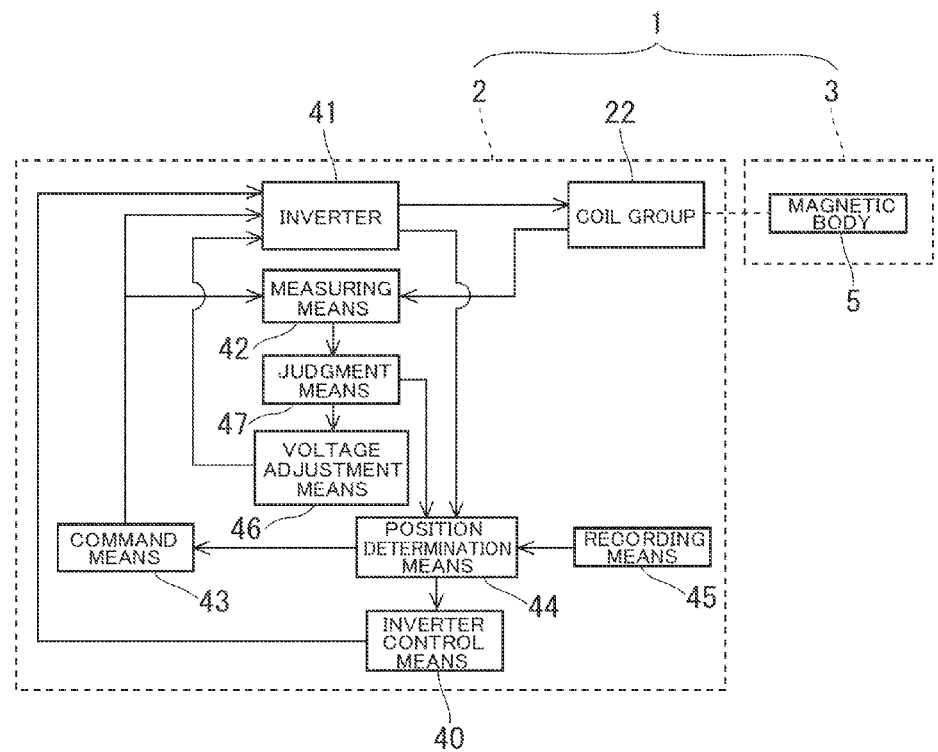
FIG. 11 is a block diagram of a moving magnet type linear motor including a position detector according to a second embodiment of the present invention.

As shown in FIG. 11, a position detector of a second embodiment includes measuring means 42, command means 43, position determination means 44, recording means 45, voltage adjustment means 46, and judgment means 47 in addition to the magnetic body 5 and the inverter 41.

The inverter 41 can receive a first command from the command means 43 that is different from the above-described command from the inverter control means 40. When receiving the first command from the command means 43, the inverter 41 selects two series-connected coils from the series-connected coils 23u, 23v and 23w of U to W phases placed in the segment 21 opposed to the magnetic body 5, and applies alternating voltages in opposite directions to the selected two series-connected coils. As a result, a magnetic field for position detection different from a shifting magnetic field is generated at a surface of the segment 21 on which coils are placed and which is opposed to the magnetic body 5.

The measuring means 42 can receive a second command from the command means 43 that is different from the first command. When receiving the second command from the command means 43, the measuring means 42 selects one series-connected coil from the series-connected coils 23u, 23v and 23w of U to W phases placed in the segment 21 opposed to the magnetic body 5, and measures a voltage (induced voltage) induced in the selected one series-connected coils.

In response to a control command from the position determination means 44, the command means 43 gives the first command to the inverter 41 intended to select two series-connected coils as targets of application of voltages from the series-connected coils 23u, 23v and 23w of U to W phases placed in the segment 21 opposed to the magnetic body 5, and to apply alternating voltages in opposite directions and of the same predetermined value V0 to the selected two series-connected coils. Further, the command means 43 gives the second command to the measuring means 42 intended to select the other series-connected coil as a target of measurement of an induced voltage that is different from the series-connected coils to be selected by the inverter 41 on receipt of the first command.

The present embodiment is described next with attention directed to three coils 22u, 22v and 22w which are placed in the direction, and which belong to the series-connected coils 23u, 23v and 23w of U to W phases (see for example FIG. 12).

As shown in FIG. 12, when the inverter 41 selects the V-phase coil 22v and the W-phase coil 22w so placed as to hold the U-phase coil 22u therebetween on receipt of the first command from the command means 43, the measuring means 42 selects the U-phase coil 22u on receipt of the second command from the command means 43 that is held between the V-phase coil 22v and the W-phase coil 22w selected by the inverter 41 on receipt of the first command.

In this case, as shown in FIG. 12, an alternating voltage Vv0 is applied to the V-phase coil 22v to generate a magnetic field Bv for position detection. Further, an alternating voltage Vw0 in a direction opposite to that of the alternating voltage Vv0 and of the predetermined value V0 same as that of the alternating voltage Vv0 is applied to the W-phase coil 22w to generate a magnetic field Bw for position detection in a direction opposite to that of the magnetic field Bv and of a magnitude same as that of the magnetic field Bv. So, as shown in FIG. 13, the magnetic fields Bv and Bw for position detection pass through two regions inside the U-phase coil 22u in which the coils overlap.

The alternating voltage Vv0 and Vw0 in the opposite directions and of the same predetermined value V0 are applied to the V-phase coil 22v and the W-phase coil 22w respectively. So, when the magnetic body 5 does not exist in a position opposed to the coils 22u, 22v and 22w of U to W phases as shown in FIG. 13, the magnetic flux of the magnetic field Bv and that of the magnetic field Bw passing through the inner side of the U-phase coil 22u offset each other. Thus, a voltage is hardly induced in the U-phase coil 22u so that a voltage measured by the measuring means 42 is substantially zero.

Figure 14:
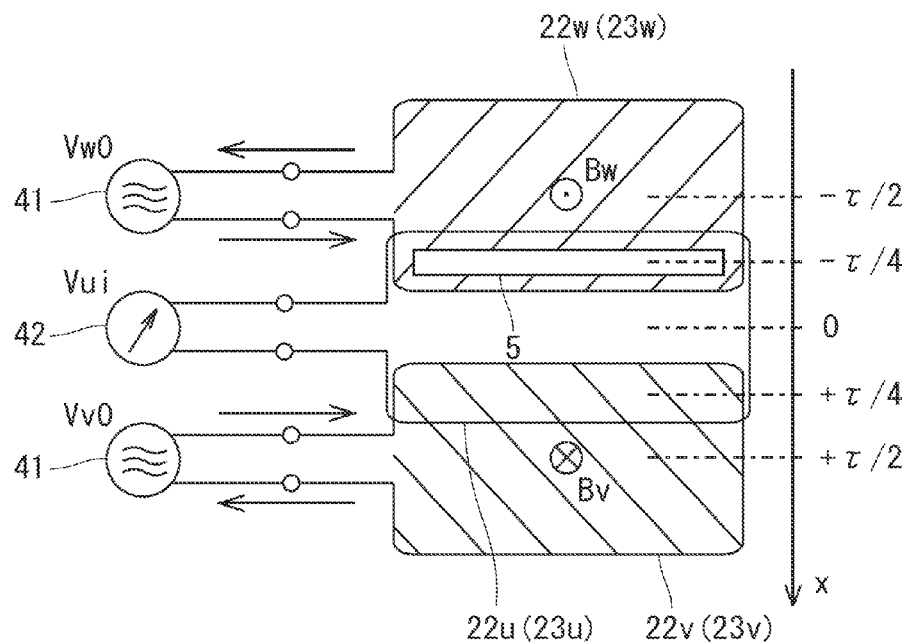
FIG. 14 is a plan view explaining a second form of position detection in the second embodiment with attention directed to three coils placed in the direction.

The magnetic body 5 has low magnetic reluctance. Thus, when the magnetic body 5 exists in a position opposed to the W-phase coil 22w to which the alternating voltage Vw0 is applied as shown in FIG. 14, the magnetic field Bw for position detection easily passes through the magnetic body 5. So, the magnetic flux density of the magnetic field Bw is high in the position in which the magnetic body 5 exists, and is low in other positions as shown in FIG. 15.

Figure 17:
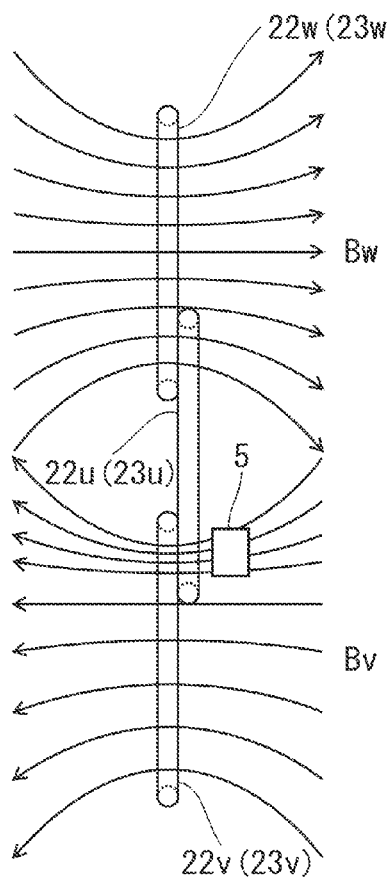
FIG. 17 is a side view of the states of magnetic fields in this third form before voltage adjustment is performed.

When the magnetic body 5 exists in a position opposed to the V-phase coil 22v to which the alternating voltage Vv0 is applied as shown in FIG. 14, the magnetic flux density of the magnetic field Bv is high in the position in which the magnetic body 5 exists, and is low in other positions as shown in FIG. 17.

Figure 15:
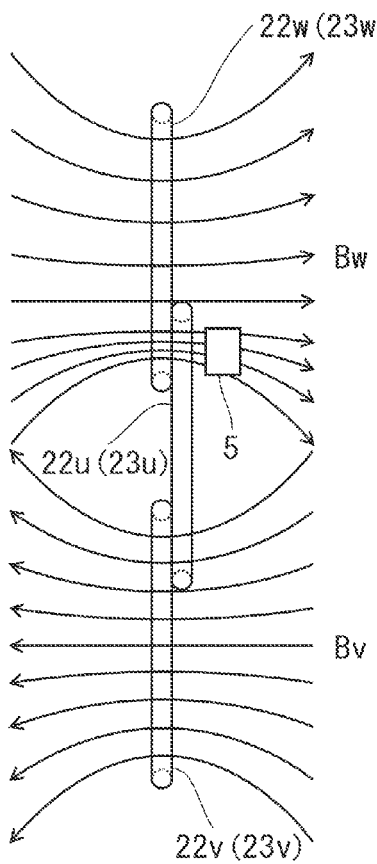
FIG. 15 is a side view of the states of magnetic fields in this second form before voltage adjustment is performed.

Accordingly, when the magnetic body 5 exists in a region in which the U-phase coil 22u and the W-phase coil 22w adjacent thereto overlap each other (when the magnetic body 5 exists in a magnetic body's position $x=-\tau/4$ or its neighboring position) as shown in FIGS. 14 and 15, the amount of magnetic flux of the magnetic field Bw passing through the inner side of the U-phase coil 22u increases. Thus, the amount of magnetic flux of the magnetic field Bw passing through the inner side of the U-phase coil 22u becomes greater than the amount of magnetic flux of the magnetic field Bv passing through the inner side of the U-phase coil 22u, by which a voltage Vui is induced in the U-phase coil 22u. The induced voltage Vui is then measured by the measuring means 42.

Figure 16:
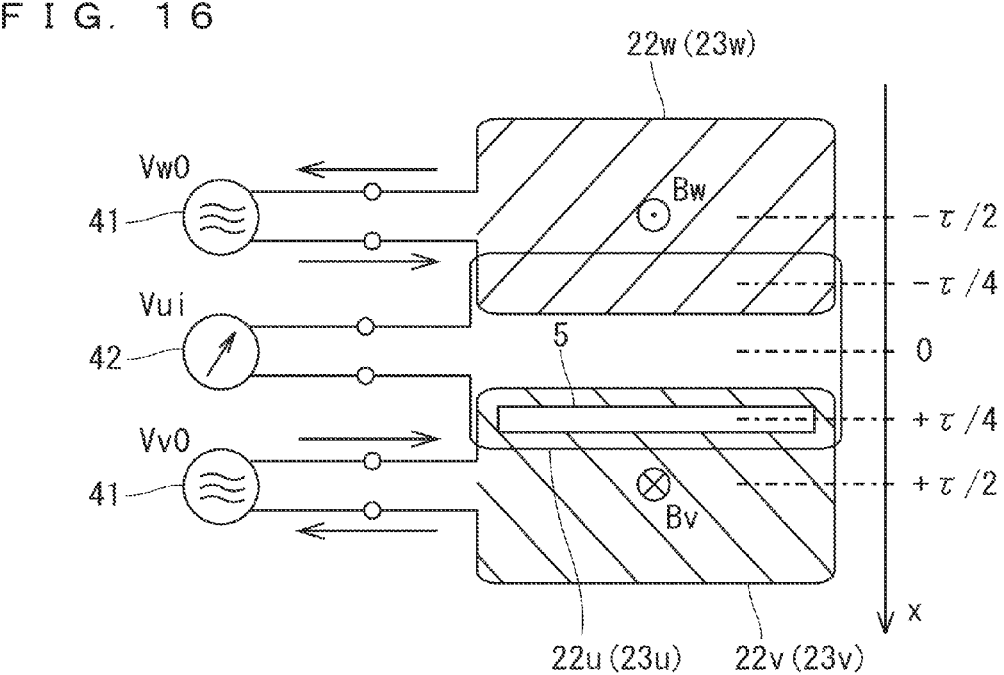
FIG. 16 is a plan view explaining a third form of position detection in the second embodiment with attention directed to three coils placed in the direction.

In contrast, when the magnetic body 5 exists in a region in which the U-phase coil 22u and the V-phase coil 22v adjacent thereto overlap each other (when the magnetic body 5 exists in the magnetic body's position $x=+\tau/4$ or its neighboring position) as shown in FIGS. 16 and 17, the amount of magnetic flux of the magnetic field Bv passing through the inner side of the U-phase coil 22u increases. Thus, the amount of magnetic flux of the magnetic field Bv passing through the inner side of the U-phase coil 22u becomes greater than the amount of magnetic flux of the magnetic field Bw passing through the inner side of the U-phase coil 22u, by which the voltage Vui is induced in the U-phase coil 22u. The induced voltage Vui is then measured by the measuring means 42.

Next, the voltage adjustment means 46 acquires the induced voltage Vui as a measured value Vui0 that is measured by and received from the measuring means 42. The voltage adjustment means 46 controls the inverter 41 based on the acquired measured value Vui0, thereby adjusting the alternating voltages Vv0 and Vw0 to be applied to the V-phase coil 22v and the W-phase coil 22w respectively in such a way that the induced voltage Vui measured by the measuring means 42 has a certain value (=0).

While the alternating voltages Vv0 and Vw0 are adjusted by the voltage adjustment means 46, the judgment means 47 acquires the induced voltage Vui as the measured value Vui0 that is measured at this time by the measuring means 42 and received from the measuring means 42. Then, the judgment means 46 determines whether or not the acquired measured value Vui0 coincides with or is close to the certain value (=0). The voltage adjustment means 46 continues to adjust the alternating voltages Vv0 and Vw0 until the judgment means 47 judges that the measured value Vui0 coincides with or is close to the certain value (=0).

Figure 18:
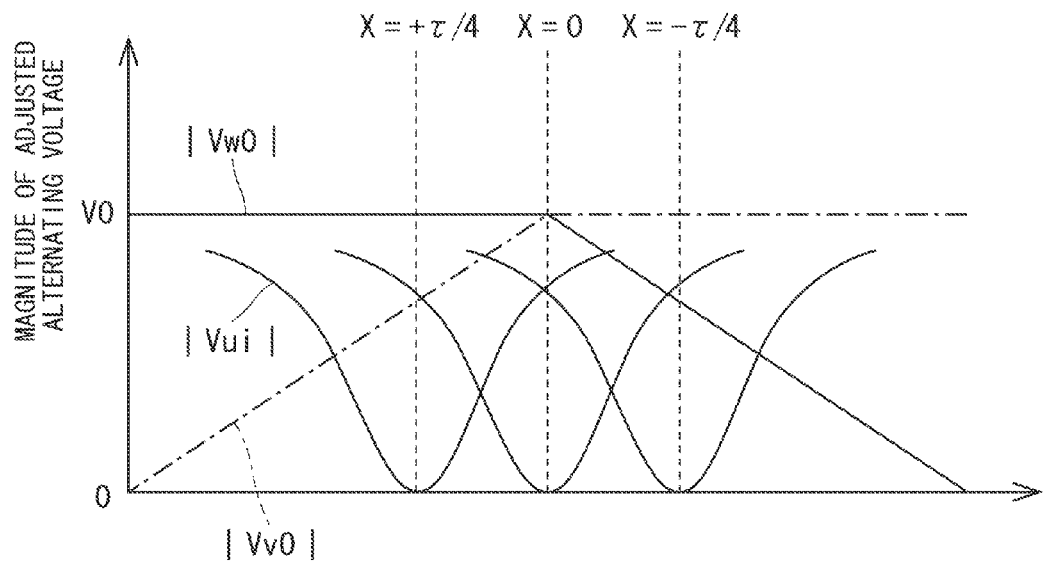
FIG. 18 explains voltage adjustment performed by voltage adjustment means.

More specifically, as shown in FIG. 18, the voltage adjustment means 46 changes the magnitude |Vv0| of the alternating voltage Vv0 applied to the V-phase coil 22v from 0 to the predetermined value V0 while fixing the magnitude |Vw0| of the alternating voltage Vw0 applied to the W-phase coil 22w at the predetermined value V0. The voltage adjustment means 46 thereafter changes the magnitude |Vw0| of the alternating voltage Vw0 applied to the W-phase coil 22w from the predetermined value V0 to 0 while fixing the magnitude |Vv0| of the alternating voltage Vv0 applied to the V-phase coil 22v at the predetermined value V0.

When the judgment means 47 judges that the measured value Vui0 acquired from the measuring means 42 coincides with or is close to the certain value (=0), the voltage adjustment means 46 finishes the adjustment of the alternating voltage Vv0 and Vw0.

Figure 19:
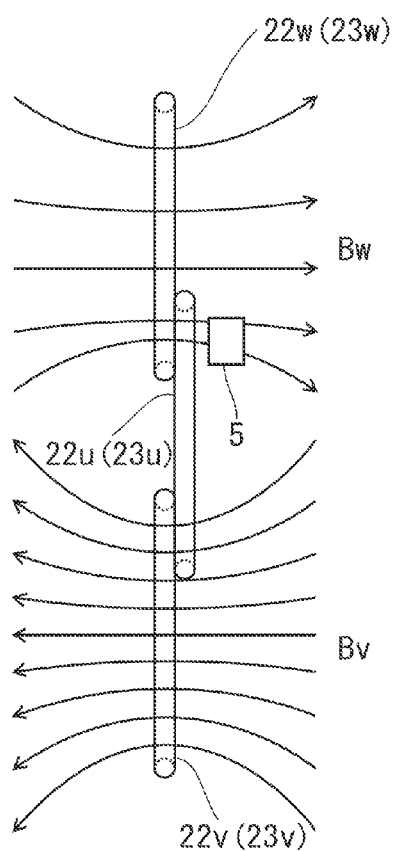
FIG. 19 is a side view of the states of magnetic fields in the second form in the second embodiment after voltage adjustment is performed.

As a result of the adjustment by the voltage adjustment means 46 (FIG. 18), when the amount of magnetic flux of the magnetic field Bw passing through the inner side of the U-phase coil 22u is greater than the amount of magnetic flux of the magnetic field Bv passing through the inner side of the U-phase coil 22u as shown in FIG. 15 (when the magnetic body 5 exists in the magnetic body's position x=−τ/4 or its neighboring position), the magnitude |Vw0| of the alternating voltage Vw0 applied to the W-phase coil 22w is adjusted to have a value smaller than the predetermined value V0 so that the induced voltage Vui measured by the measuring means 42 has the certain value (=0). Then, the amount of magnetic flux of the magnetic field Bw passing through the inner side of the U-phase coil 22u is the same as the amount of magnetic flux of the magnetic field Bv passing through the inner side of the U-phase coil 22u as shown in FIG. 19. So, the magnetic fields Bv and Bw offset each other at the inner side of the U-phase coil 22u.

Figure 20:
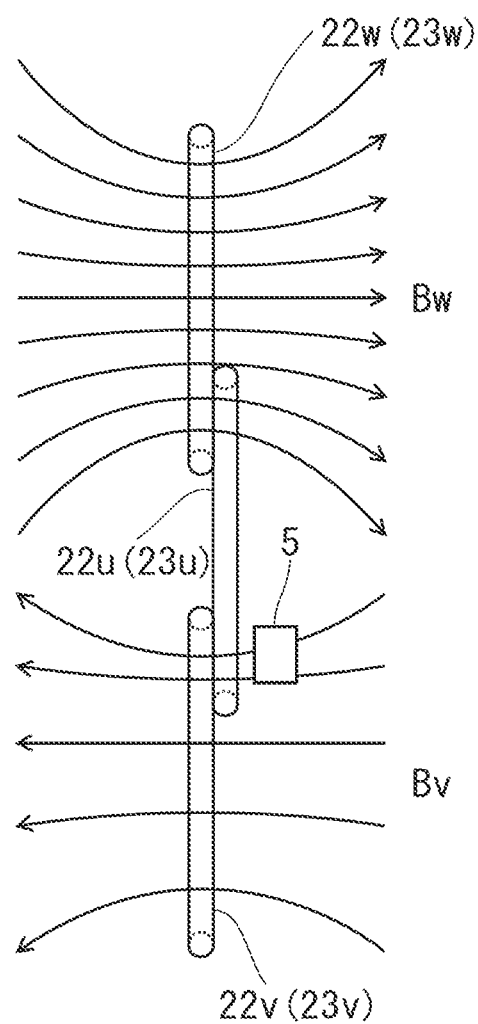
FIG. 20 is a side view of the states of magnetic fields in the third form in the second embodiment after voltage adjustment is performed.

In contrast, as a result of the adjustment by the voltage adjustment means 46 (FIG. 18), when the amount of magnetic flux of the magnetic field Bv passing through the inner side of the U-phase coil 22u is greater than the amount of magnetic flux of the magnetic field Bw passing through the inner side of the U-phase coil 22u as shown in FIG. 17 (when the magnetic body 5 exists in the magnetic body's position x=+τ/4 or its neighboring position), the magnitude |Vv0| of the alternating voltage Vv0 applied to the V-phase coil 22v is adjusted to have a value smaller than the predetermined value V0 so that the induced voltage Vui measured by the measuring means 42 has the certain value (=0). Then, the amount of magnetic flux of the magnetic field Bv passing through the inner side of the U-phase coil 22u is the same as the amount of magnetic flux of the magnetic field Bw passing through the inner side of the U-phase coil 22u as shown in FIG. 20. So, the magnetic fields Bv and Bw offset each other at the inner side of the U-phase coil 22u.

When the magnetic body 5 exists in the center position of the U-phase coil 22u as shown in FIG. 21 (when the magnetic body 5 exists in the magnetic body's position x=0), the magnetic body 5 exerts substantially no influence upon the two magnetic fields Bv and Bw. Thus, the amounts of magnetic flux of the magnetic fields Bv and Bw passing through the inner side of the U-phase coil 22u are the same, so that a voltage is hardly induced in the U-phase coil 22u. As a result, the magnitudes |Vv0| and |Vw0| of the alternating voltages Vv0 and Vw0 after the adjustment both remain at the predetermined value V0 (see FIG. 18).

The two alternating voltage Vv0 and Vw0 thereby adjusted change in response to the magnetic body's position x, and have one-to-one relation with the magnetic body's position x.

The recording means 45 contains a table showing the relation between the magnetic body's position x and the magnitudes |Vv0|, |Vw0| of the two adjusted alternating voltages.

This table is determined by the size of a coil, the number of turns of wire in the coil, the size of a magnetic body, the magnetic property of the magnetic body, and others, and can be obtained in advance by experiment or by analysis. The table may be obtained by experiment as follows: The two adjusted alternating voltages Vv0 and Vw0 are measured while the magnetic body 5 is actually caused to move. The table may be obtained by analysis as follows: A magnetic field model is formulated about a system including the moving magnet type linear motor 1 and the magnetic body 5, and analysis is conducted on the magnetic field model using the finite element method.

When the judgment means 47 judges that the measured value Vui0 received from the measuring means 42 coincides with or is close to the certain value (=0), the position determination means 44 acquires the alternating voltages Vv0 and Vw0 from the inverter 41 that are applied from the inverter 41 to the V-phase coil 22v and the W-phase coil 22w respectively. Based on the two acquired alternating voltages Vv0 and Vw0, the position determination means 44 determines the position of the magnetic body 5 that changes in response to the position of the mover 3.

More specifically, based on the two alternating voltages Vv0 and Vw0 received from the inverter 41, the position determination means 44 acquires the position x corresponding to the magnitudes |Vv0| and |Vw0| of the two alternating voltages Vv0 and Vw0 from the table stored in the recording means 45. Then, the position determination means 44 determines the acquired position x as the position of the magnetic body 5. Thus, in the position detector of the second embodiment, the position of the magnetic body 5 is uniquely defined from the two adjusted alternating voltages Vv0 and Vw0.

In the above-described determination of the position of the magnetic body 5 from the two alternating voltage Vv0 and Vw0 received from the inverter 41, the position of the magnetic body 5 has high accuracy when it is detected in a range of the magnetic body's position x where the difference between the amounts of magnetic flux of the unadjusted magnetic fields Bv and Bw passing through the inner side of the U-phase coil 22u varies significantly with the change of the position x of the magnetic body 5, namely when it is detected in a range where x is between −τ/4 and +τ/4 with respect to the center position of the U-phase coil 22u (x=0).

When the inverter 41 selects the U-phase coil 22u and the W-phase coil 22w so placed as to hold the V-phase coil 22v therebetween on receipt of the first command from the command means 43, and the measuring means 42 selects the V-phase coil 22v on receipt of the second command from the command means 43 that is held between the U-phase coil 22u and the W-phase coil 22w selected by the inverter 41 on receipt of the first command, the position of the magnetic body 5 with high accuracy is detected in a range where x is between −τ/4 and τ/4 with respect to the center position of the V-phase coil 22v (x=0) based on the same principle as that described above.

Likewise, When the inverter 41 selects the U-phase coil 22*u* and the V-phase coil 22*v* so placed as to hold the W-phase coil 22*w* therebetween on receipt of the first command from the command means 43, and the measuring means 42 selects the W-phase coil 22*v* on receipt of the second command from the command means 43 that is held between the U-phase coil 22*u* and the V-phase coil 22*v* selected by the inverter 41 on receipt of the first command, the position of the magnetic body 5 with high accuracy is detected in a range where x is between $-\tau/4$ and $+\tau/4$ with respect to the center position of the W-phase coil 22*w* (x=0).

When alternating voltages are applied to coils in a pair so placed as to hold any one of the coils 22*u*, 22*v* and 22*w* therebetween to perform the detection, the detected position of the magnetic body 5 may be beyond a range where x is between $-\tau/4$ and $+\tau/4$. In this case, alternating voltages are applied to coils in a pair so placed as to hold a different coil therebetween to perform the detection again, so that the position of the magnetic body 5 with high accuracy can be detected in a range where x is between $-\tau/4$ and $+\tau/4$ with respect to the center position of the coil targeted for the measurement of an induced voltage (coil held between the coils in a pair).

Thus, the position detector of the second embodiment can detect the position of the magnetic body 5 with high accuracy regardless of where the detected position of the magnetic body 5 is.

As described, the position detector of the second embodiment detects the position of the magnetic body 5 based on adjusted alternating voltages to be applied to coils in a pair. So, in the moving magnet type linear motor 1, the position of the mover 3 is detected on the side of the stator 2. Thus, unlike the conventionally used moving magnet type linear motor, communication means is not required to be provided in the moving magnet type linear motor 1 even when servo control or the like is performed by using the detected position of the mover 3.

Further, alternating voltages are applied to coils to generate magnetic fields for position detection in the position detector described above. So, the generated magnetic fields are oscillating magnetic fields. Thus, even when the mover 3 stops and the magnetic body 5 stops accordingly, a voltage is induced in a coil held between coils in a pair to which the alternating voltages are applied, so that the position of the magnetic body 5 can be detected.

In the position detector described above, alternating voltages are applied only to series-connected coils in a pair of the series-connected coils 23*u*, 23*v* and 23*w* of U to W phases placed in the segment 21 opposed to the magnetic body 5. This reduces power consumption required for detecting the position of the magnetic body 5.

4. Detection of Absolute Position of Magnetic Body

In the position detectors of the first and second embodiments described above, the position x of the magnetic body 5 with high accuracy relative to any coil is detected in the range where x is between $-\tau/4$ and $+\tau/4$ with respect to the center position of this coil (x=0).

So, in order to detect the absolute position of the magnetic body 5, a distance L from an initial position in which the magnetic body 5 can be detected by a switch, a sensor or the like to the center position of a coil set opposed to the magnetic body 5 (center position of the V-phase coil 22*v*) should be determined.

As described above, the permanent magnets placed in the mover 3 each have a length substantially the same as the center distance $\tau$ (see FIG. 2) between the U-phase coil 22*u* and the W-phase coil 22*w* belonging to the same coil set. When a three-phase alternating voltage is applied to the coil group 22 of the stator 2 in order for the mover 3 to move in this structure, the mover 3 moves a distance corresponding to the center distance between two coils of the same phase belonging to adjacent coil sets for every one oscillation cycle of the three-phase alternating voltage.

Thus, by counting the number of cycles of oscillation the three-phase voltage applied to the coil group 22 have made from the time when the magnetic body 5 existed in the initial position, the distance L from the initial position to the center position of a coil set opposed to the magnetic body 5 can be determined.

The distance L thereby determined is added to the position of the magnetic body 5 detected by the position detector. Further, a correction value determined by which phase's center position of a coil was used as a basis for the detection of the position of the magnetic body 5 by the position detector is added to the detected position of the magnetic body 5. As a result, the absolute position of the magnetic body 5 is determined.

The correction value is zero when the position of magnetic body 5 is obtained with respect to the center position of the V-phase coil 22*v*, $-\tau/2$ (or $+\tau/2$) when the position of the magnetic body 5 is obtained with respect to the center position of the U-phase coil 22*u*, and $+\tau/2$ (or $-\tau/2$) when the position of the magnetic body 5 is obtained with respect to the center position of the W-phase coil 22*w*.

The structure of each part of the present invention is not limited to that shown in the embodiments described above. Various modifications may be devised within the technical scope defined in claims. In the embodiments described above, the position detector of the present invention is applied to a moving magnet type linear motor in which adjacent coils overlap in part each other, to which the present invention is not intended to be confined. The present invention is also applicable for example to a moving magnet type linear motor in which adjacent coils do not overlap each other, provided that the adjacent coils should have such positional relation that a magnetic field generated in one coil passes through the inner side of the other coil. Or, in terms of relation with the adjacent coils, the magnetic body 5 should have such a shape that a magnetic field generated in one coil passes through the inner side of the other coil via the magnetic body 5.

In the embodiments described above, four coil sets are placed in each segment 21, to which the present invention is not intended to be confined. As an example, each segment 21 may include only one coil set, or may include two or more but not four coil sets.

In the embodiments described above, the magnetic body 5 is fixed to the mover 3 in such a way that a group of the segments 21 opposed to the mover 3 in part or in their entirety and the segment 21 opposed to the magnetic body 5 hold only one different segment 21 therebetween, to which the present invention is not intended to be confined. By way of example, the magnetic body 5 may be fixed to the mover 3 in such a way that the segment 21 opposed to the magnetic body 5 adjoins the group of the segments 21. Alternatively, the magnetic body 5 may be fixed to the mover 3 in such a way that the group of the segments 21 and the segment 21 opposed to the magnetic body 5 hold two or more segments 21 therebetween.

Further, in the embodiments described above, the position detectors include the command means 43 that gives commands (first and second commands) to the inverter 41 and to the measuring means 42, to which the present invention is not intended to be confined. The inverter control means 40 may give commands (first and second commands) to the inverter 41 and to the measuring means 42 in place of the command means 43.

Still further, in the embodiments described above, the position detectors perform position detection using coils for driving the mover 3. Alternatively, the position detectors may perform position detection using a coil for position detection provided to the stator 2 that is prepared separately from the coils for driving the mover.

In addition, in the embodiments described above, the measuring means 42 measures a voltage induced in a coil. The measuring means 42 may measure a current induced in a coil instead.

EXPLANATION OF REFERENCE NUMERALS

1 moving magnet type linear motor
2 stator
21 segment
22 coil group
22*u* U-phase coil
22*v* V-phase coil
22*w* W-phase coil
3 mover
40 inverter control means
41 inverter (power supply control means)
42 measuring means
43 command means
44 position determination means
45 recording means
46 voltage adjustment means
47 judgment means
5 magnetic body

The invention claimed is:

1. A position detector for a moving magnet type linear motor, the moving magnet type linear motor including: a stator with a plurality of coils placed in one direction; and a mover with a permanent magnet so placed as to be opposed to the stator, a magnetic field generated by applying a voltage to the plurality of coils of said stator causing said mover to move in said direction, the position detector detecting the position of the mover in the moving magnet type linear motor, the position detector comprising:
   a magnetic body fixed to said mover;
   power supply control means for generating a magnetic field for position detection by applying a voltage to a coil selected on receipt of a command;
   measuring means for measuring a current or a voltage induced in a coil selected on receipt of a command;
   command means for giving a first command to said power supply control means intended to select one or two or more coils as a target of application of a voltage, and a second command to said measuring means intended to select a coil as a target of measurement of a current or a voltage that is adjacent to the coil to be selected by said power supply control means on receipt of said first command; and
   position determination means for determining the position of said magnetic body that changes in response to the position of said mover based on a measured value obtained by said measuring means, by controlling the command operation by said command means.

2. The position detector for a moving magnet type linear motor according to claim 1, wherein
   the second command given from said command means to the measuring means is intended to select coils in a pair placed on opposite sides of a coil to be selected by said power supply control means on receipt of said first command, said measuring means selects said coils in a pair on receipt of said second command to measure currents or voltages induced in the coils in a pair, and said position determination means acquires two measured values obtained by said measuring means, and determines the position of said magnetic body based on the two measured values.

3. The position detector for a moving magnet type linear motor according to claim 2, further comprising recording means in which a table indicating the relation between the position of said magnetic body and currents or voltages induced in said coils is stored, wherein
   based on the table stored in said recording means, said position determination means determines at least one position corresponding to one of the measured values obtained by said measuring means as first position information, determines at least one position corresponding to the other one of the measured values as second position information, selects a position which is contained in the first position information and which coincides with or is close to a position contained in said second position information, and determines the selected position as the position of the magnetic body.

4. The position detector for a moving magnet type linear motor according to claim 1, wherein the first command given from said command means to the power supply control means is intended to select coils in a pair as targets of application of voltages that are so placed as to hold one coil therebetween, and the second command given from said command means to the measuring means is intended to select the coil as a target of measurement of a current or a voltage that is to be held between said coils in a pair,
   the position detector further comprising:
   voltage adjustment means for acquiring the measured value obtained by said measuring means, and for adjusting voltages to be applied to said coils in a pair in such a way that the measured value obtained by said measuring means becomes a certain value by controlling said power supply control means based on the acquired measured value; and
   judgment means for acquiring the measured value obtained by said measuring means, and for determining whether or not the acquired measured value coincides with or is close to said certain value,
   when said judgment means judges that said measured value coincides with or is close to the certain value, said position determination means acquiring voltages applied to said coils in a pair from said power supply control means, and determining the position of said magnetic body based on the two acquired voltages.

5. The position detector for a moving magnet type linear motor according to claim 4, wherein said power supply control means applies voltages to the coils in a pair selected on receipt of the first command from the command means in such a way that magnetic fields in opposite directions are generated at the inner side of coil held between the coils in a pair.

6. The position detector for a moving magnet type linear motor according to claim 5, wherein said voltage adjustment means controls said power supply control means to adjust voltages to be applied to said coils in a pair in such a way that the magnetic fields generated by applying the voltages to the coils in a pair offset each other at the inner side of the coil held between the coils in a pair.

7. The position detector for a moving magnet type linear motor according to claim 4, further comprising recording means in which a table indicating the relation between the position of said magnetic body and voltages is stored, the voltages being applied to said coils in a pair when the measured value obtained by said measuring means is the same as the certain value, wherein based on the table stored in said recording means, said position determination means determines the position of said magnetic body from the two voltages obtained from said power supply control means.

8. The position detector for a moving magnet type linear motor according to claim 1, wherein said magnetic body is placed in a position to be opposed to a coil that is different from a coil opposed to said permanent magnet.

9. The position detector for a moving magnet type linear motor according to claim 1, wherein said stator is divided into a plurality of segments, in each one of which the plurality of coils are placed in said direction, and a power supply control means can control a voltage to be applied to each coil on a segment by segment basis.

10. The position detector for a moving magnet type linear motor according to claim 9, wherein each segment includes at least one coil set constituted by three coils.

11. The position detector for a moving magnet type linear motor according to claim 1, wherein voltages applied from a power supply control means to said plurality of coils are alternating voltages.

12. The position detector for a moving magnet type linear motor according to claim 1, wherein said magnetic body is made of a paramagnetic material.

* * * * *